United States Patent
Thomas et al.

(10) Patent No.: US 9,259,770 B2
(45) Date of Patent: *Feb. 16, 2016

(54) THERMAL TREATMENT OF A CONTAMINATED VOLUME OF MATERIAL

(75) Inventors: David Glynn Thomas, Wembley Downs (AU); Thomas Peargin, El Cerrito, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/454,426

(22) Filed: Apr. 24, 2012

(65) Prior Publication Data
US 2012/0288332 A1 Nov. 15, 2012

Related U.S. Application Data

(60) Provisional application No. 61/484,491, filed on May 10, 2011.

(51) Int. Cl.
*B09C 1/06* (2006.01)
*B09B 3/00* (2006.01)
*F23C 99/00* (2006.01)
(Continued)

(52) U.S. Cl.
CPC ............... *B09B 3/0083* (2013.01); *B09C 1/06* (2013.01); *F23C 99/006* (2013.01); *F23G 5/34* (2013.01); *F23G 5/50* (2013.01); *F23G 7/14* (2013.01); *F23G 2202/101* (2013.01); *F23G 2207/20* (2013.01); *F23G 2207/30* (2013.01); *F23G 2900/7005* (2013.01)

(58) Field of Classification Search
CPC ................................ F23G 7/14; F23C 99/066
USPC ................ 405/128.1, 128.15, 128.7, 128.85, 405/128.45, 128.6; 175/66; 588/411, 320; 110/188, 191, 229, 346, 348
See application file for complete search history.

(56) References Cited

U.S. PATENT DOCUMENTS

| 797,624 | A | | 8/1905 | Staudt |
| 4,683,963 | A | * | 8/1987 | Skinner ......................... 175/66 |

(Continued)

FOREIGN PATENT DOCUMENTS

| JP | 09-206726 | 8/1997 |
| JP | 08-141537 | 6/1998 |

(Continued)

OTHER PUBLICATIONS

Pironi; Smouldering Combustion of Organic Liquids in Porous Media for Remediating NAPL-contaminated Soils. Aug. 2009.*

(Continued)

*Primary Examiner* — Sean Andrish
(74) *Attorney, Agent, or Firm* — Frank C. Turner; Carlos L. Hanze

(57) ABSTRACT

A method and apparatus for remediating porous contaminated material. In the method, fuel material is combined with the contaminated material and a smoldering combustion process is initiated in the contaminated material to remediate the contaminated material. Control systems are provided to control the smoldering combustion process. The contaminated material may include oily waste, asbestos fibers, and/or at least one of a chlorinated solvent, a polychlorinated biphenyl (PCB), a dioxin, a furan and a polynuclear aromatic hydrocarbon (PAH).

5 Claims, 2 Drawing Sheets

(51) Int. Cl.
*F23G 5/34* (2006.01)
*F23G 5/50* (2006.01)
*F23G 7/14* (2006.01)

(56) References Cited

U.S. PATENT DOCUMENTS

| | | | |
|---|---|---|---|
| 5,190,645 A * | 3/1993 | Burgess | 210/144 |
| 5,355,782 A * | 10/1994 | Blanchard | 99/482 |
| 5,769,569 A | 6/1998 | Hosseini | |
| 7,175,366 B2 * | 2/2007 | Geisel | 405/128.85 |
| 7,326,002 B2 * | 2/2008 | Kerfoot | 405/128.25 |
| 8,132,987 B2 | 3/2012 | Gerhard et al. | |
| 2007/0131864 A1 * | 6/2007 | Ellis et al. | 250/343 |
| 2009/0039031 A1 * | 2/2009 | Gustafson et al. | 210/747 |
| 2009/0180836 A1 | 7/2009 | Gerhard et al. | |
| 2009/0260826 A1 * | 10/2009 | Sherwood et al. | 166/305.1 |
| 2011/0124745 A1 * | 5/2011 | Jessop et al. | 516/67 |
| 2012/0272878 A1 | 11/2012 | Grant et al. | |

FOREIGN PATENT DOCUMENTS

| | | |
|---|---|---|
| JP | 11-351533 | 12/1999 |
| JP | 2004-167390 | 6/2004 |
| JP | 2008-253912 | 10/2008 |

OTHER PUBLICATIONS

PCT Search Report and Written Opinion of the International Searching Authority, PCT/US2012/034796, Aug. 9, 2012.

* cited by examiner

THERMAL TREATMENT OF A CONTAMINATED VOLUME OF MATERIAL

This Application is based upon and claims the benefit of U.S. Provisional Application 61/484,491 filed May 10, 2011, the entire contents of which are incorporated herein by reference.

FIELD OF THE INVENTION

The present invention relates to a method and system for remediating contaminated material by thermal treatment. In particular, the invention relates to methods of remediating material by smoldering combustion processes.

BACKGROUND OF THE INVENTION

A commonly encountered problem is the need to remediate soils that have been contaminated with industrial chemicals such as oily wastes. Soils are often contaminated with hydrocarbons such as oil and fuels. In some instances the contaminants may include materials such as asbestos.

Various thermal treatments for remediating contaminated land have been proposed. For example, U.S. Pat. No. 5,769,569 describes an in-situ thermal desorption system that is used to mobilize and remove non-volatile and semi-volatile hydrocarbons from contaminated soil. Combustion is initiated in a burner underneath the contaminated soil zone and persistent hydrocarbons are thermally desorbed by direct heating of the contaminated zone. The generated soil vapors are collected and the desorbed vapors are processed in a hydrocarbon recovery and treatment assembly.

German patent application 2 020 612, filed on 28 Apr. 1970, describes a method and device for eliminating oil that has penetrated into the soil. A borehole is drilled in the earth down to the contaminated region. The oil in the soil is brought to a combustion temperature. Once the oil has reached its combustion temperature and is burning automatically, then it is only necessary to supply oxygen to sustain the combustion. The oil is thus incinerated within the earth at its location, i.e. in-situ treatment.

A similar process is described in German application DE 36 19 494 A1, filed on 6 Oct. 1986. Injection torches are introduced into the soil to generate a high temperature, using added air at the deepest point of the injection hole. This heats the ground sufficiently such that combustible substances such as waste oils and the like are ignited, thus achieving in-situ incineration of the soil contamination. There may be combustion of the contaminated soil up to the surface.

A further such process is described in the International application WO 2007/066125, filed on 8 Dec. 2006. Land contaminated with combustible materials may be cleaned or remediated by combusting the materials in-situ (i.e. within the ground). Combustion of the material may be self-sustaining in that it may only be necessary to supply sufficient energy to ignite the material. Once ignited, combustion may proceed in the presence of oxygen. This is contrasted with known thermal remediation processes which require continuous energy input to sustain the incineration.

There is an ongoing need for cost-effective methods of treating contaminated material.

SUMMARY OF THE INVENTION

According to a first aspect of the invention there is provided a method for treating a volume of porous contaminated material, which includes the steps of combining the porous contaminated material with a fuel material to provide a combustible mixture, and initiating a smoldering combustion process in at least a portion of the combustible mixture to thereby remediate the contaminated volume.

A specified process temperature may be required for the smoldering combustion process to remediate the contaminated material and the addition of the fuel material may provide the specified process temperature during combustion.

In one application the contaminated material may comprise asbestos fibers.

According to a second aspect of the invention there is provided a method for thermal treatment of contaminated material, which includes the steps of: providing a reaction vessel having an ignition system; combining a porous contaminated material with a fuel material to provide a combustible mixture in the reaction vessel; and activating the ignition system to initiate a smoldering combustion process in at least a portion of the combustible mixture and thereby remediate the contaminated material.

According to a further aspect of the invention there is provided a method for thermal treatment of a volume of land holding contaminated material, which includes the steps of: providing a structure for air distribution in the volume of land; providing a subterranean ignition system in the volume of land; adding a fuel material to the volume of land to provide a combustible mixture comprising the contaminated material; activating the ignition system to initiate a smoldering combustion process in the combustible mixture and thereby remediate the contaminated material; and distributing air into combustible mixture via the structure to sustain the smoldering combustion process.

According to a further aspect of the invention there is provided a system for treating a volume of porous contaminated material. The system includes: a) a reaction vessel that in use contains the volume of contaminated material, the reaction vessel having: an ignition system; and a distribution structure for distributing a gaseous oxidizer into the reaction vessel; b) a fuel delivery system for adding a fuel material to the contaminated material; and c) a control system in data communication with the ignition system, the distribution structure and the fuel delivery system, the control system having a computer processor having computer readable media programmed with software instructions for executing on one or more data processors to: monitor addition of the fuel material to the contaminated material so as to provide a combustible mixture; activate the ignition system to initiate a smoldering combustion process in at least a portion of the combustible mixture in the reaction vessel; and control the distribution of the oxidizer into the reaction vessel to sustain the smoldering combustion process.

According to a further aspect of the invention there is provided an article of manufacture having a computer readable medium having a computer readable code embodied therein, the computer readable code adapted to be executed to implement a method for treating a volume of porous contaminated material, the method including the steps of: monitoring addition of the fuel material to the contaminated material so as to provide a combustible mixture; activating the ignition system to initiate a smoldering combustion process in at least a portion of the combustible mixture in the reaction vessel; and controlling the distribution of the oxidizer into the reaction vessel to sustain the smoldering combustion process.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

It has been recognized that smoldering combustion processes may be a useful technique in the remediation of contaminated soils. However, in many instances the contaminated material may not include an adequate concentration of combustible material to sustain efficient combustion. In other instances there may be specific requirements that the combustion process must satisfy in order to effectively remediate the contaminated material. An example of this is the case of soil contaminated with friable asbestos fibers. Asbestos may be converted to inert non-hazardous silicate-based material by heating the asbestos to between 800° C. and 1,200° C.

Described herein is a method for thermal treatment of contaminated material in which a fuel material is combined with a contaminated material to provide a combustible mixture. The contaminated material is porous, providing interstitial spaces which may be occupied by the fuel material. The ratio of porous contaminated material to fuel material is determined such that a smoldering combustion process may be initiated in the combustible mixture in order to remediate the contaminated material. In some applications such as the treatment of asbestos, an objective of adding the fuel material is to ensure that the resulting smoldering combustion process reaches the required temperature range.

Note, certain aspects of the present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Figure 1:
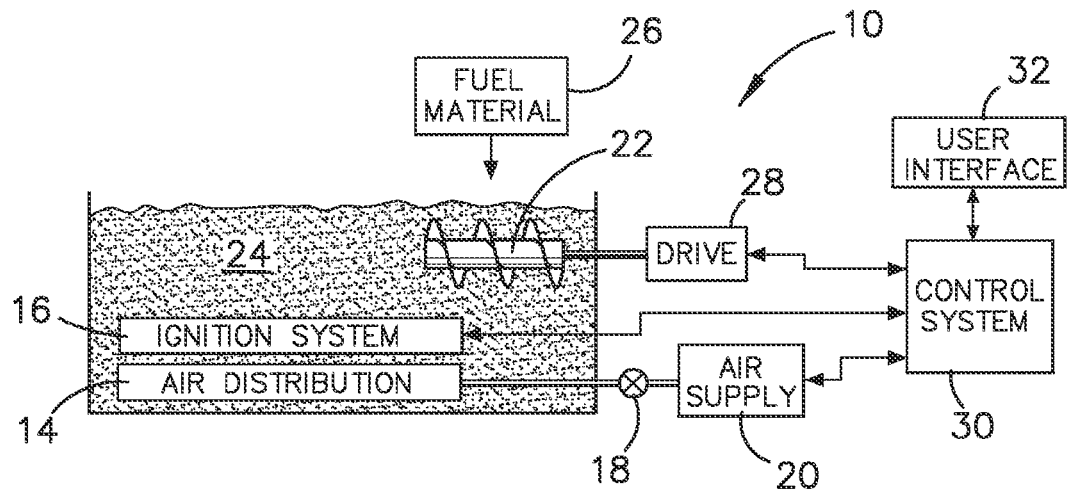
FIG. 1 is a schematic diagram of a system including a reaction vessel in which a smoldering combustion process is initiated to remediate contaminated material.

FIG. 1. shows a schematic representation of a system 10 in which the smoldering combustion process may be operated.

The smoldering combustion process takes place in a reaction vessel 12 which may be constructed above the ground or at the ground surface. A wide range of materials may be used to construct the vessel 12, including for example metals, bricks and mounded earth.

The vessel includes a structure 14 for distributing air into the vessel. Although the depicted arrangement illustrates the distribution of air, more generally the system 14 may be used to distribute a gas that acts to sustain the smoldering combustion process once initiated in the vessel. Examples of such gases include oxygen, oxygen-enriched air or other gases that are appropriate for sustaining a smoldering combustion process or which serve to optimize the remediation of a particular contaminant present in the treated material. Thus, air used to propagate the smoldering combustion process may be supplemented with a fuel or another gas, for example natural gas, propane, butane, nitrogen or carbon dioxide, in order to control or modify the properties of the combustion process.

The air distribution structure 14 may be a network of piping that is perforated or slotted to enable the passage of gas into the reaction vessel. The network of piping may, for example, be a metal or ceramic structure. The feedpipe to the air distribution structure 14 includes an actuator 18 that is used to control the pressure or flow rate of gas into the distribution system 14. The system includes an air supply 20, which may include a compression system to supply compressed air to the distribution structure 14. If an additional gas is added to the air supply there may be further storage vessels to store the additional gas and controllable valves operable to mix the additional gas with the air supply.

The reaction vessel 12 also includes an ignition system 16, which serves to raise the temperature of the combustible mixture 24 in the vicinity of the ignition system to a temperature that is sufficiently high to initiate the smoldering combustion. There are several ways in which the ignition system 16 may be implemented. For example, the ignition system may use electrical resistance heating to increase temperature. Alternatively, the ignition system may include a gas burner that burns an ignition gas in order to raise the temperature of the surrounding mixture. In this case, the ignition system would include a feedpipe to the exterior of the vessel 12 in order to supply the ignition fuel to the ignition system. An actuator and gas supply would then be provided to control the flow of the ignition fuel to the ignition system 16.

In use, the reaction vessel 12 contains a contaminated material for remediation. An example of such a contaminated material is an oily waste, which may be liquid, solid or a mixture of both phases. The contents of the vessel may also include porous media to act as a matrix for the smoldering combustion process. The porous matrix may, for example, be soil onto which the oily waste has been spilt or deposited. In other applications an inert material such as ceramic balls may be added to the contents of the vessel in order to provide a framework for the combustion. The porosity of the material in the vessel should be sufficient to allow penetration of a fuel material and to permit a flux of an oxidizer such as air to sustain the smoldering combustion. The porous matrix in the reaction vessel may include particulates, grains, fibers or mixtures thereof. Porosity is a parameter that describes the ratio of void space to the total bulk of the material. The porosity of the contaminated material in the reaction vessel may range, for example, between around 0.01 for material such as rock to around 0.7 for a porous clay or peat.

A fuel material 26 is combined with the contaminated material in the reaction vessel in order to ensure that sufficient conditions exist for a combustion process to be initiated by the ignition system 16. The fuel material 26 may include waste oil, sludge or other predominately oily waste. Examples of such a waste are tank-bottom sludges and oil sediments that derive from settling ponds. Other examples of fuel material include coal, coke, diesel fuel and paraffin. The fuel material may include solids, liquids or liquids with suspended solid material. One way of measuring the proportion of combustible material in the combustible mixture 24 is to consider the volume fraction of the pore space that is occupied by combustible material. Preferably the volume fraction in the combustible mixture is greater than 10% to enable a self-sustaining combustion front to propagate through the vessel. A target range of the volume fraction in the combustible mixture 24 is 10% to 25%.

Higher volume fractions, for example in the range 25%-50% may also be used, although there may be trade-offs to consider in establishing a target range. For example, the overall cost of the remediation process may increase if greater quantities of fuel material are added. Also, adding large amounts of fuel material 26 may reduce the available volume in the reaction vessel for the contaminated volume of porous material.

Another measure for characterizing the combustible mixture 24 is the mass of combustible material per unit mass of the mixture 24. In the case of coal tars it has been shown that smoldering combustion may be sustained if the concentration of coal tar is in the range of 28,400 to 142,000 mg/kg. In the case of crude oil it has been shown that smoldering combustion may be sustained if the concentration of crude oil is in the range of 31,200 to 104,000 mg/kg. This combustion is discussed in Pironi et al "Self-sustaining smoldering combustion for NAPL remediation: laboratory evaluation of process sensitivity to key parameters", *Environ. Sci. Technol.* 2011, 45, 2980-2986.

Thus, for example, if a contaminated volume of material has a volume fraction of combustible material in the pore space less than 10%, the contaminated volume is not suitable for thermal treatment by smoldering or flameless combustion. Using the methods described herein, a fuel material is combined with the contaminated volume of material in order to increase the volume fraction into the target range of 10-25%. A smoldering combustion process may then be initiated. In another example, if a contaminated volume of material contains less than 30,000 mg/kg of crude oil, the contaminated volume may be remediated by combination with a fuel material and initiation of smoldering combustion.

In some applications the fuel material 26 may be sufficiently fluid to be poured onto the volume of contaminated material in the reaction vessel. In this case, the fluid fuel material seeps through the interstitial spaces of the contaminated material to spread through the volume of the reaction vessel 12.

The fuel material 26 may also consist of or include a non-waste liquid or solid. An example is a food-grade environmentally-friendly oil such as a vegetable oil. Such non-waste fuel materials may, for example, be injected or blended into the porous contaminated material in areas where waste materials may not be appropriate or where use of waste materials may be regulated or forbidden.

The reaction vessel 12 may include an actuator 22 to mix or blend the contaminated material and the added fuel material in order to reduce the heterogeneity of the resulting combustible mixture 24. An example of an actuator 22 is a soil auger having a helical structure to turn and blend the combustible mixture 24. The actuator 22 may have an associated drive 28. In some arrangements the actuator 22 may be a mobile system that is inserted into the reaction vessel in order to blend the material during the combining or admixing of the fuel material and the porous contaminated material. In other arrangements the contaminated material may be combined with the fuel material before the resulting combination is added to the reaction vessel. For example, the combination may occur in a storage vessel (not shown). The combustible mixture may then be transported to the reaction vessel 12, for example via a pipe or conveyor system or in a vehicle. In some instances earth-moving equipment may be used to combine or blend the combustible mixture 24.

The purpose of the combining or mixing is to reduce the heterogeneity of the combustible mixture. In general, it is not necessary to eliminate variation of the material. However it is desirable to avoid having regions within the reaction vessel that do not have a sufficient concentration of combustible material to sustain the smoldering combustion process.

The system 10 may include a control system 30 that is programmed to supervise the operation of the thermal treatment. The control system 30 typically includes at least one computational device, which may be a microprocessor, a microcontroller, a programmable logical device or other suitable device. Instructions and data to control operation of the computational device may be stored in a memory which is in data communication with, or forms part of, the computational device. Typically, the control system 30 includes both volatile and non-volatile memory and more than one of each type of memory. The instructions and data for controlling operation of a system 10 may be stored on a computer readable medium from which they are loaded into the memory. Instructions and data may be conveyed to the control system by means of a data signal in a transmission channel. Examples of such transmission channels include network connections, the internet or an intranet and wireless communication channels.

The control system 30 is typically in data communication with a user interface 32 that allows users to enter information into the control system and also includes displays to enable users to monitor the operation of the system 10. The control system is in data communication with the air distribution system 14, valve 18, air supply 20 and the drive 28 of the actuator 22.

The control system 30 may, for example, be a SCADA system, which provides system control and data acquisition.

The system 10 may include instrumentation to monitor various aspects of the operation. For example, flow meters may be provided on the feed systems to the air distribution structure 14 and, if appropriate, to the ignition system 16. Pressure gauges may be provided for use with the air supply 20. Temperature measurements may also be positioned in or around the vessel 12 to monitor the state of the vessel and the combustion process occurring therein. In addition, cameras may be provided to enable remote monitoring of the operation of the reaction vessel 12.

Where such instrumentation is provided, the data generated by the instrumentation may be displayed locally in the vicinity of the instruments. Alternatively or in addition, the data may be provided to the control system 30 for display on the user interface 32 and storage in memory.

The contaminated material in the reaction vessel 12 may contain concentrations of contaminants that would be prone to treatment or destruction by temperatures in excess of 400° C., but where the concentration of material in the soil is initially less than what is necessary to optimize the reaction. Examples of contaminants include chlorinated solvents, polychlorinated biphenyls (PCB), dioxins, furans and polynuclear aromatic hydrocarbons (PAH).

The fuel material 26, which may also include contaminants for thermal treatment, is added to increase concentrations of material in the combustible mixture 24 to a level that is sufficient to provide or optimize the reaction that treats or destroys the contaminants. In many applications the desired combustion occurs in the temperature range of 400° C. to 1,000° C. In some instances such as the treatment of friable asbestos fibers, higher temperatures may be required, for example a temperate range between 800° C. and 1,200° C.

Figure 2:
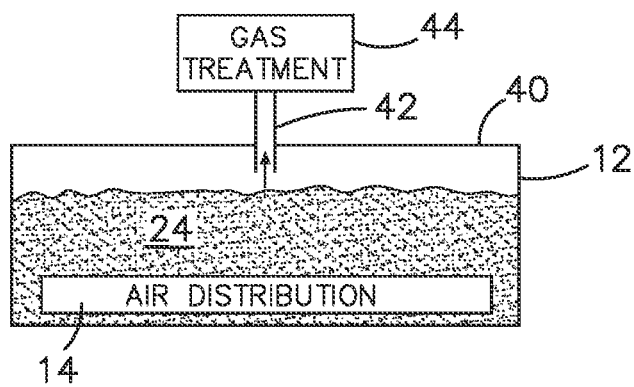
FIG. 2 is a schematic diagram of a reaction vessel having a cover to capture off-gases from the smoldering combustion process within the reaction vessel.

FIG. 2 is a schematic depiction of an alternative arrangement in which the reaction vessel 12 is provided with a cover 40 that serves to trap off-gases produced in the combustion of the combustible mixture 24. One or more flues 42 are provided in the cover 40 to remove the gases to a gas treatment process 44.

Figure 3:
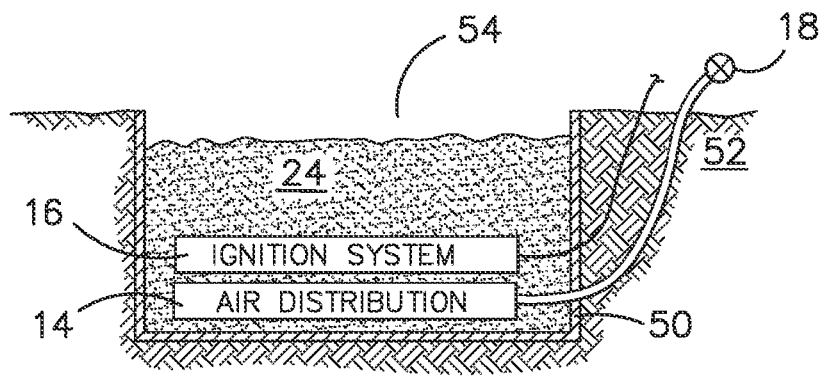
FIG. 3 is a schematic diagram of an arrangement in which a pit is excavated in the ground to provide a reaction vessel for the smoldering combustion process.

A further arrangement is shown in FIG. 3, in which a pit 54 is excavated in the ground 52 in order to provide a reaction vessel for the thermal treatment of contaminated material. The pit 54 may be lined with a thermal barrier 50 which may serve to limit or prevent the flow of liquids or gases from the pit 54 to adjacent regions. The barriers 50 may also serve to insulate the pit 54 to limit heat losses from the combustion process. Such thermal insulation may serve to improve the efficiency of the combustion.

A distribution structure 14 is provided in the reaction vessel to provide a suitable flow of gaseous oxidizer into the combustible mixture 24. A feedpipe links the air distribution structure to a valve 18 and a controller to control the flow of the oxidizer into the combustible mixture. As before, an ignition system 16 is provided to raise the temperature of a region of the combustible mixture adjacent to the ignition system sufficiently high to initiate combustion.

In the case of in-situ thermal processing, the properties of the contaminated porous medium are altered through processes including, but not limited to, mixing, blending, injection and hydraulic fracturing (also known as fracing), to produce conditions in the treatment zone that optimize the reaction, thereby remediating the contaminated material. As described, these operations may include blending the mixture with a soil auger to remove heterogeneities. The combustible mixture may also be blended with oil or other fuel materials to supplement or achieve a minimum concentration to support a sustainable reaction.

Figure 4A:
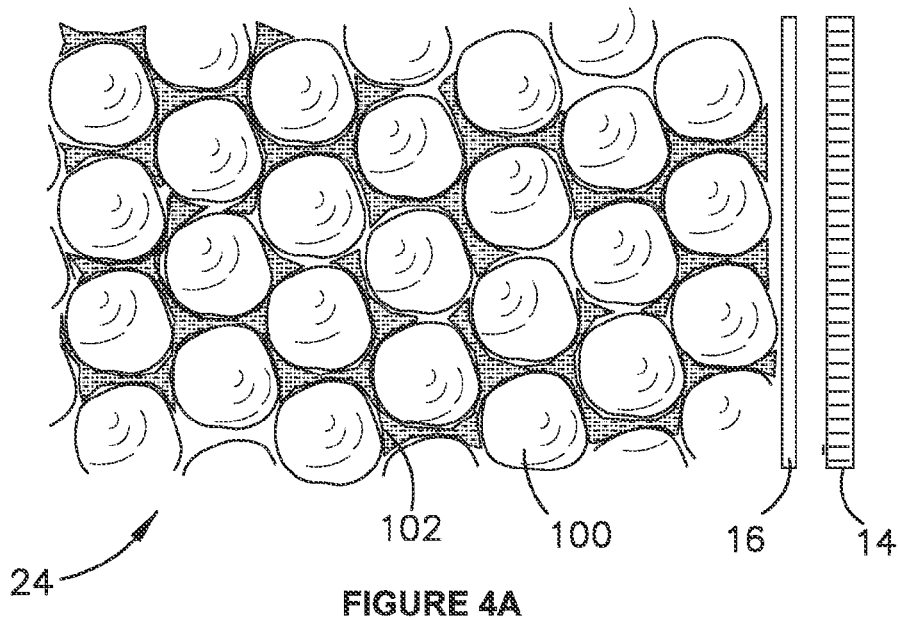
FIGS. 4A and 4B are schematic representations of the initiation of a smoldering combustion process in a combustible mixture that includes contaminated material.
Figure 4B:
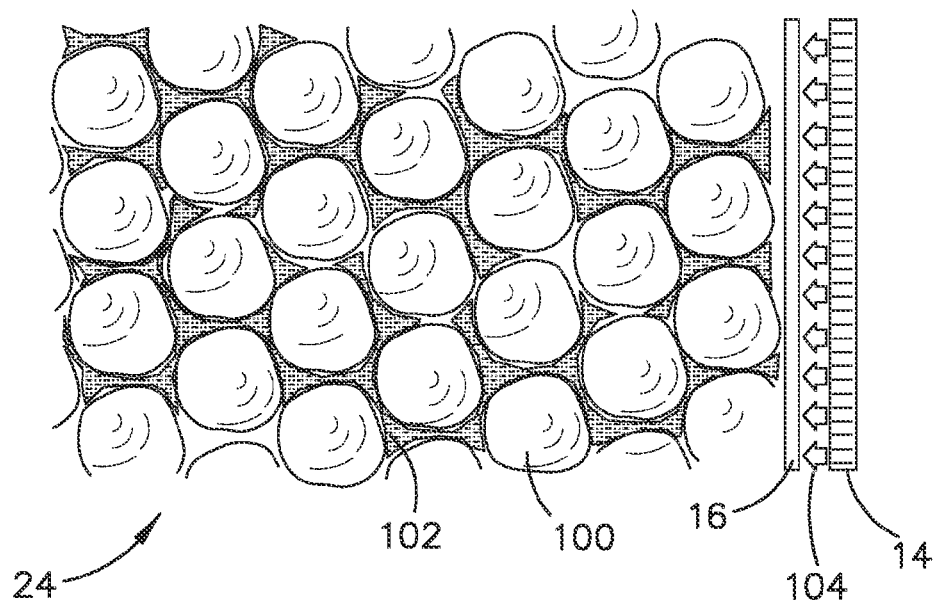

FIGS. 4A and 4B are schematic representations of the smoldering combustion process that is initiated in the reaction vessel. The combustible mixture 24 is depictured as including a matrix of porous material, for example 100. The porous matrix 100 need not be uniform in its structural composition and may include particular material, grains or fibers. The contaminated porous material may include soil containing oily waste or other contaminants 102. The amount of interstitial space between the elements 100 of the contaminated mixture influences the nature of the combustion process. The pore volume available influences the amount of fluid material that may be introduced between the contaminated porous material 100. The porosity of the combustible mixture 24 also has an effect on the oxidizer flux and hence on the flow rate and pressure required of the air supply 20. The control system 30 having a computer processor and computer readable media may be programmed to control or vary the air supply to the air distribution structure 14. For example, in some applications increasing the flow rate of oxidizer may increase the combustion temperature. The flow rate of oxidizer into the combustible mixture 24 may be expressed as a Darcy flux. A suitable range of oxidizer flux to sustain smoldering combustion in the reaction vessel may be 0.5 to 10.0 cm/s.

FIG. 4A shows schematically the ignition system 16 being heated to reach a specified ignition temperature. At the depicted stage, the air supply through the air distribution structure 14 may still be switched off. Once the ignition system has reached a suitable temperature, which may for example be in the range of 200° C. to 400° C., the air supply 104 is switched on. The organic waste in the combustible mixture 24 ignites and creates a smoldering combustion front that moves through the combustible mixture 24. The source of external heating via the ignition system 16 may be switched off while the air supply 104 continues in order to sustain the smoldering combustion. In some applications the combustion may provide a near complete conversion of organic wastes to $CO_2$. The combustion process ends if the combustible material in the vessel is destroyed or if the supply of oxidizer is interrupted.

Smoldering combustion processes are discussed, for example, in Pironi et al 'Small-scale forward smoldering experiments for remediation of coal tar in inert media', *Proceedings of the Combustion Institute* 32, pp. 1957-1964, 2009. Smoldering combustion is described as the flameless burning of a condensed fuel that derives heat from surface oxidation reactions. The smoldering combustion is a relatively slow and relatively low-temperature flameless combustion sustained by the heat resulting from the combustion of an oxidizer on the surface of a condensed-phase fuel (i.e. a solid or liquid).

The methods described herein provide a potentially low-cost and effective treatment of material that would otherwise be very costly or impractical to treat at all. In many cases, the end product of the combustion process may be suitable for reuse, as opposed to previously-existing options that typically involve containment of the contaminated material requiring long-term management or off-site disposal.

The treatment and disposal of many wastes containing organic concentrates less than what is needed to sustain a smoldering reaction have the same cost and practical restraints of treating heavily impacted oily wastes. The processes described herein may appear counterintuitive as they involve making some wastes more contaminated (for example by adding higher concentrations of organic fuel) so that the resulting combustible mixture may be treated with a smoldering combustion process.

The operation of the reaction vessel 12 may be supplemented by the management of a plurality of stockpiles of waste material having different concentrations of contaminants. An inventory of available waste materials may be maintained in order to determine suitable sources of fuel material 26 and contaminated material for mixing in the reaction vessel 12 to achieve conditions required to treat the contaminants. Management of the stockpiles may also be operated from the control system 30. Where the combustible mixture is prepared externally of the reaction vessel, the external combination may also be supervised from the control system 30.

It will be understood that the invention disclosed and defined in this specification extends to all alternative combinations of two or more of the individual features mentioned or evident from the text or drawings. All of these different combinations constitute various alternative aspects of the invention.

What is claimed is:
1. A system for treating a volume of porous contaminated material comprising:
   a) a reaction vessel that in use contains the volume of contaminated material, the reaction vessel comprising:
      i) an ignition system; and ii) a distribution structure for distributing a gaseous oxidizer into the reaction vessel;

b) a fuel delivery system for adding a fuel material to the contaminated material; and c) a control system in data communication with the ignition system, the distribution structure and the fuel delivery system, the control system comprising a computer processor and computer readable media programmed with software instructions for executing on one or more data processors to:

A) monitor addition of the fuel material to the contaminated material so as to provide a combustible mixture;

B) activate the ignition system to initiate a smoldering combustion process in at least a portion of the combustible mixture in the reaction vessel;

C) control the distribution of the oxidizer into the reaction vessel to sustain the smoldering combustion process; and D) determine a proportion of porous contaminated material to fuel material required in the combustible mixture such that the smoldering combustion process is operable to remediate the contaminated material.

2. The system of claim 1 wherein the control system comprises software instructions to de-activate the ignition system after the smoldering combustion process has been initiated.

3. The system of claim 1 comprising an actuator to mix the porous contaminated material and the fuel material to reduce heterogeneity of the combustible mixture.

4. An article of manufacture comprising a non-transitory computer readable medium having a computer readable code embodied therein, the computer readable code programmed with software instructions that when executed implement a method for treating a volume of porous contaminated material, the method comprising:

A) monitoring addition of fuel material to a contaminated material so as to provide a combustible mixture;

B) activating an ignition system to initiate a smoldering combustion process in at least a portion of the combustible mixture in a reaction vessel;

C) controlling the distribution of an oxidizer into the reaction vessel to sustain the smoldering combustion process; and D) determining a proportion of porous contaminated material to fuel material required in the combustible mixture such that the smoldering combustion process is operable to remediate the contaminated material.

5. The article of manufacture of claim 4, wherein the method further comprises de-activating the ignition system after the smoldering combustion process has been initiated.

* * * * *